United States Patent
Wang et al.

(10) Patent No.: US 11,886,222 B1
(45) Date of Patent: Jan. 30, 2024

(54) DYNAMIC LINK LIBRARY LOADING METHOD AND APPARATUS

(71) Applicant: Huawei Technologies Co., Ltd., Shenzhen (CN)

(72) Inventors: Tao Wang, Shenzhen (CN); Wenyong Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/796,454

(22) PCT Filed: Nov. 27, 2020

(86) PCT No.: PCT/CN2020/132417
§ 371 (c)(1),
(2) Date: Jul. 29, 2022

(87) PCT Pub. No.: WO2021/151350
PCT Pub. Date: Aug. 5, 2021

(30) Foreign Application Priority Data

Jan. 31, 2020 (CN) .......................... 202010077751.9

(51) Int. Cl.
*G06F 9/44* (2018.01)
*G06F 9/445* (2018.01)

(52) U.S. Cl.
CPC ................ *G06F 9/44521* (2013.01)

(58) Field of Classification Search
None
See application file for complete search history.

(56) References Cited

U.S. PATENT DOCUMENTS

| | | | |
|---|---|---|---|
| 5,375,241 A | 12/1994 | Walsh | |
| 5,633,654 A * | 5/1997 | Kennedy, Jr. | G09G 5/39 345/553 |
| 5,916,308 A | 6/1999 | Duncan et al. | |
| 6,363,436 B1 | 3/2002 | Hagy et al. | |
| 7,735,075 B2 | 6/2010 | Fan et al. | |

(Continued)

FOREIGN PATENT DOCUMENTS

| | | |
|---|---|---|
| CN | 103488466 B | 2/2017 |
| CN | 106775744 A | 5/2017 |

(Continued)

OTHER PUBLICATIONS

Wei Dong et al.,"Dynamic linking and loading in networked embedded systems," Oct. 12-15, 2009, 9 pages.

*Primary Examiner* — Craig C Dorais
(74) *Attorney, Agent, or Firm* — Conley Rose, P.C.

(57) ABSTRACT

A dynamic link library loading method includes: when an identifier of a first dynamic link library is not in a list of loaded dynamic link libraries, allocating a handle to the first dynamic link library, and adding the identifier of the first dynamic link library and the handle allocated to the first dynamic link library to the list of the loaded dynamic link libraries; and when the first dynamic link library is an integrated dynamic link library, adding identifiers of one or more dynamic link libraries for integration and the handle allocated to the first dynamic link library to the list of loaded dynamic link libraries; and based on the handle allocated to the first dynamic link library, loading the first dynamic link library into a running memory of an electronic device.

20 Claims, 5 Drawing Sheets

(56) References Cited

U.S. PATENT DOCUMENTS

| | | | |
|---|---|---|---|
| 2006/0026584 A1* | 2/2006 | Muratori | G06F 9/44521 |
| | | | 717/163 |
| 2007/0143398 A1 | 6/2007 | Graham | |
| 2016/0321089 A1 | 11/2016 | Sandlin et al. | |
| 2018/0268116 A1* | 9/2018 | Deaver | G06F 21/629 |
| 2018/0357085 A1 | 12/2018 | Yan et al. | |
| 2020/0278875 A1 | 9/2020 | Chan et al. | |

FOREIGN PATENT DOCUMENTS

| | | | |
|---|---|---|---|
| CN | 107291513 A | 10/2017 | |
| CN | 107391190 A | 11/2017 | |
| CN | 109542043 A | 3/2019 | |
| CN | 109814939 A | 5/2019 | |
| EP | 2477110 A1 | 7/2012 | |

\* cited by examiner

DYNAMIC LINK LIBRARY LOADING METHOD AND APPARATUS

CROSS-REFERENCE TO RELATED APPLICATIONS

This is a U.S. National Stage of International Patent Application No. PCT/CN2020/132417 filed on Nov. 27, 2020, which claims priority to Chinese Patent Application No. 202010077751.9 filed on Jan. 31, 2020. Both of the aforementioned applications are hereby incorporated by reference in their entireties.

TECHNICAL FIELD

This application relates to the field of computer technologies, and in particular, to a dynamic link library loading method and an apparatus.

BACKGROUND

In an electronic device, sharing of code, a variable, or the like may be implemented by running different application programs via a dynamic link library (dynamic link library. DLL). This helps reduce overheads of a disk and running memory. Dynamic and static libraries are organized by section (section), and each section is aligned by page (for example, 4 KB). However, when an actual size of the section is not an integral multiple of a page size, a waste of running memory is prone to occur. Especially, when there are a large quantity of dynamic link libraries in the electronic device, the waste of running memory may be more serious. For example, there are 200 dynamic link libraries, each dynamic link library includes a code section, a data section, and a BSS section, and each section is aligned by 4 KB. If each section wastes 2 KB memory on average, the 200 dynamic link libraries waste about 1200 KB running memory.

In addition, when the application program needs to run based on a dynamic link library, the dynamic link library can be used only after relocation, symbol parsing, and binding are performed. In addition, the dynamic link library may depend on another dynamic link library. Therefore, the application program not only needs to relocate the dynamic link library, but also needs to relocate another dynamic link library on which the dynamic link library depends, so as to implement normal running. This possibly causes large time overheads.

SUMMARY

This application provides a dynamic link library loading method and an apparatus, to help reduce a waste of running memory and reduce time overheads when an application program runs.

According to a first aspect, an embodiment of this application provides a dynamic link library loading method, applied to an electronic device, and specifically including: in response to a request of an application program for loading a first dynamic link library, determining whether an identifier of the first dynamic link library is in a list of loaded dynamic link libraries; and when the identifier of the first dynamic link library is not in the list of loaded dynamic link libraries, performing steps A to C: step A: allocating a handle to the first dynamic link library, and adding the identifier of the first dynamic link library and the handle allocated to the first dynamic link library to the list of loaded dynamic link libraries; step B: determining whether the first dynamic link library is an integrated dynamic link library; and when the first dynamic link library is the integrated dynamic link library, perform step 1 and step 2, and perform step C after performing step 2, where step 1: adding identifiers of M dynamic link libraries for integration and the handle allocated to the first dynamic link library to the list of loaded dynamic link libraries, where the first dynamic link library is obtained through a compiler by compiling source code of the M dynamic link libraries for integration, and M is a positive integer greater than 1; and step 2 is specifically: relocating the first dynamic link library based on the handle allocated to the first dynamic link library, and loading the first dynamic link library into a running memory of the electronic device; and step C: returning the handle allocated to the first dynamic link library to the application program.

In this embodiment of this application, when the electronic device can, in response to the request of the application program for loading the first dynamic link library, determine that the identifier of the first dynamic link library is not in the list of loaded dynamic link libraries, the electronic device not only can allocate the handle to the first dynamic link library and add the identifier of the first dynamic link library and the allocated handle to the list of added dynamic link libraries, but also can determine whether the first dynamic link library is the integrated dynamic link library. The integrated dynamic link library is obtained by compiling source code of a plurality of dynamic link libraries for integration. This helps reduce a waste of running memory. In addition, when the first dynamic link library is the integrated dynamic link library, the electronic device further adds the identifier of the dynamic link library for integration and the handle allocated to the first dynamic link library to the list of loaded dynamic link libraries. This helps avoid repeated loading of the electronic device, and further helps reduce a quantity of times that the application program relocates the dynamic link library. In this way, time overheads are reduced.

In a possible design, when the first dynamic link library is the integrated dynamic link library, the first dynamic link library includes a virtual library list section and N binary sections. The virtual library list section includes the identifiers of the M dynamic link libraries for integration. Any one of the N binary sections includes content of a corresponding binary section in the M dynamic link libraries for integration, and N is a positive integer greater than or equal to 1. The virtual library list section is added to the integrated dynamic link library, so that the electronic device can identify that the integrated dynamic link library is obtained by compiling source code of which dynamic link libraries. This helps invocation of the application program.

In a possible design, when the application program is started, respond to a request of the application program for cyclically loading a dependency library of the application program, where the first dynamic link library is one of dependency libraries of the application program. Alternatively, when the application program runs, respond to the request of the application program for loading the first dynamic link library. This helps simplify the implementation.

In a possible design, the first dynamic link library may be obtained by compiling source code of the M dynamic link libraries for integration in the following manner:

The first dynamic link library is obtained by integrating M static link libraries, and each of the M static link libraries is obtained by compiling corresponding source code in the source code of the M dynamic link libraries for integration. This is easy to implement.

In a possible design, after the in response to a request of an application program for loading a first dynamic link library, determining whether an identifier of the first dynamic link library is in a list of loaded dynamic link libraries, the method further includes; when the identifier of the first dynamic link library is in the list of loaded dynamic link libraries, performing step D, and performing step C after performing step D.

Step D: obtaining the handle of the first dynamic link library based on the identifier of the first dynamic link library in the list of loaded dynamic link libraries.

In a possible design, after step B of determining whether the first dynamic link library is an integrated dynamic link library, the method further includes: when the first dynamic link library is not the integrated dynamic link library, performing step 3, and performing step C after performing step 3.

Step 3: relocating the first dynamic link library based on the handle allocated to the first dynamic link library, and loading the first dynamic link library into the running memory of the electronic device.

In a possible design, the electronic device may determine whether the first dynamic link library is the integrated dynamic link library in the following manner:

determining whether the first dynamic link includes the virtual list section, where when the first dynamic link library includes the virtual list section, the first dynamic link library is the integrated dynamic link library; or determining whether the identifier of the first dynamic link library is a predefined identifier, where when the identifier of the first dynamic link library is the predefined identifier, the first dynamic link library is the integrated dynamic link library.

According to the foregoing technical solutions, the electronic device determines whether the first dynamic link library is the integrated dynamic link library.

According to a second aspect, an embodiment of this application provides an apparatus. The apparatus includes a link request module and a link loading module. The link request module is configured to receive a request of an application program for loading a first dynamic link library.

The link loading module is configured to: in response to the request for loading the first dynamic link library, determine whether an identifier of the first dynamic link library is in a list of loaded dynamic link libraries; and when the identifier of the first dynamic link library is not in the list of loaded dynamic link libraries, perform steps A to C: step A: allocating a handle to the first dynamic link library, and adding the identifier of the first dynamic link library and the handle allocated to the first dynamic link library to the list of loaded dynamic link libraries; step B: determining whether the first dynamic link library is an integrated dynamic link library; and when the first dynamic link library is the integrated dynamic link library, perform step 1 and step 2, and perform step C after performing step 2, where step 1: adding identifiers of M dynamic link libraries for integration and the handle allocated to the first dynamic link library to the list of loaded dynamic link libraries, where the first dynamic link library is obtained through a compiler by compiling source code of the M dynamic link libraries for integration; and step 2: relocating the first dynamic link library based on the handle allocated to the first dynamic link library, and loading the first dynamic link library into the running memory of the electronic device; and step C: returning the handle allocated to the first dynamic link library to the application program.

In a possible design, the first dynamic link library includes a virtual library list section and N binary sections. The virtual library list section includes the identifiers of the M dynamic link libraries for integration. Any one of the N binary sections includes content of a corresponding binary section in the M dynamic link libraries for integration, and N is a positive integer greater than or equal to 1.

In a possible design, when the application program is started, respond to a request of the application program for cyclically loading a dependency library of the application program, where the first dynamic link library is one of dependency libraries of the application program. Alternatively, when the application program runs, respond to the request of the application program for loading the first dynamic link library.

In a possible design, the first dynamic link library may be obtained by compiling source code of the M dynamic link libraries for integration in the following manner:

The first dynamic link library is obtained by integrating M static link libraries, and each of the M static link libraries is obtained by compiling corresponding source code in the source code of the M dynamic link libraries for integration. This is easy to implement.

In a possible design, after the link loading module is configured to determine whether the identifier of the first dynamic link library is in the list of loaded dynamic link libraries, the link loading module is further configured to: when the identifier of the first dynamic link library is in the list of loaded dynamic link libraries, perform step D, and perform step C after performing step D.

Step D: obtaining the handle of the first dynamic link library based on the identifier of the first dynamic link library in the list of loaded dynamic link libraries.

In a possible design, after performing step B of determining whether the first dynamic link library is an integrated dynamic link library, the link loading module is further configured to: when the first dynamic link library is not the integrated dynamic link library, perform step 3, and perform step C after performing step 3.

Step 3: relocating the first dynamic link library based on the handle allocated to the first dynamic link library, and loading the first dynamic link library into the running memory of the electronic device.

In a possible design, the link loading module may determine whether the first dynamic link library is the integrated dynamic link library in the following manner:

determining whether the first dynamic link library includes the virtual list section, where when the first dynamic link library includes the virtual list section, the first dynamic link library is the integrated dynamic link library; or determining whether the identifier of the first dynamic link library is a predefined identifier, where when the identifier of the first dynamic link library is the predefined identifier, the first dynamic link library is the integrated dynamic link library.

According to a third aspect, an embodiment of this application provides an electronic device, including a functional module for implementing the method according to any one of the foregoing aspects or the possible designs provided in the foregoing aspects.

According to a fourth aspect, an embodiment of this application provides a chip. The chip is coupled to a memory in an electronic device, so that when operating, the chip invokes a computer program stored in the memory, to perform the method according to any one of the first aspect or the possible designs provided in the first aspect of embodiments of this application.

According to a fifth aspect, an embodiment of this application provides a computer-readable storage medium. The computer-readable storage medium stores a computer program, and when the computer program is run on an electronic device, the electronic device is enabled to implement the method according to any one of the first aspect or the possible designs provided in the first aspect.

According to a sixth aspect, an embodiment of this application provides a computer readable storage medium. The computer readable storage medium includes an integrated dynamic link library, and when the integrated dynamic link library is loaded on the electronic device, the electronic device is enabled to perform the method according to any one of the first aspect or the possible designs provided in the first aspect.

According to a seventh aspect, an embodiment of this application provides a computer program product. When the computer program product is run on an electronic device, the electronic device is enabled to perform the method according to any one of the first aspect or the possible designs provided in the first aspect.

In addition, for technical effects brought by any possible design manner according to the second to the seventh aspects, refer to technical effects brought by different design manners in the first aspect, and details are not described herein again.

DESCRIPTION OF EMBODIMENTS

It should be understood that "at least one" in embodiments of this application refers to one or more. "A plurality of" means two or more than two. "At least one of the following items (pieces)" or a similar expression thereof indicates any combination of these items, including a single item (piece) or any combination of a plurality of items (pieces). For example, at least one of a, b, or c may represent seven cases: a, b, c, a and b, a and c, b and c, and a, b and c. Each of a, b, and c may be an element, or may be a set including one or more elements. The character "/" generally indicates an "or" relationship between associated objects. "And/or" describes an association relationship between associated objects, and indicates that three relationships may exist. For example, A and/or B may represent the following three cases: Only A exists, both A and B exist, and only B exists. A and B may be singular or plural.

In this application, "example", "in some embodiments", "in some other embodiments", or the like is used to represent giving an example, an illustration, or a description. Any embodiment or design scheme described as the "example" in this application should not be explained as being more preferred or having more advantages than another embodiment or design scheme. Specifically, the term "example" is used to present a concept in a specific manner.

It should be noted that, in embodiments of this application, terms such as "first" and "second" are only used for a purpose of distinction in description, but should not be understood as an indication or implication of relative importance or an indication or implication of a sequence.

In this embodiment of this application, an integrated dynamic link library is introduced, so that an electronic device can run an application program based on the integrated dynamic link library. The integrated dynamic link library is obtained through a compiler by compiling source code of a plurality of dynamic link libraries for integration before delivery of the electronic device. This not only helps reduce a waste of running memory, but also helps reduce a quantity of times that the application program relocates a dynamic link library. In this way, time overheads are reduced.

For example, the electronic device in embodiments of this application may be a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application. An example embodiment of the electronic device includes but is not limited to a device using iOS®, Android®, Microsoft®, or another operating system.

Figure 1:
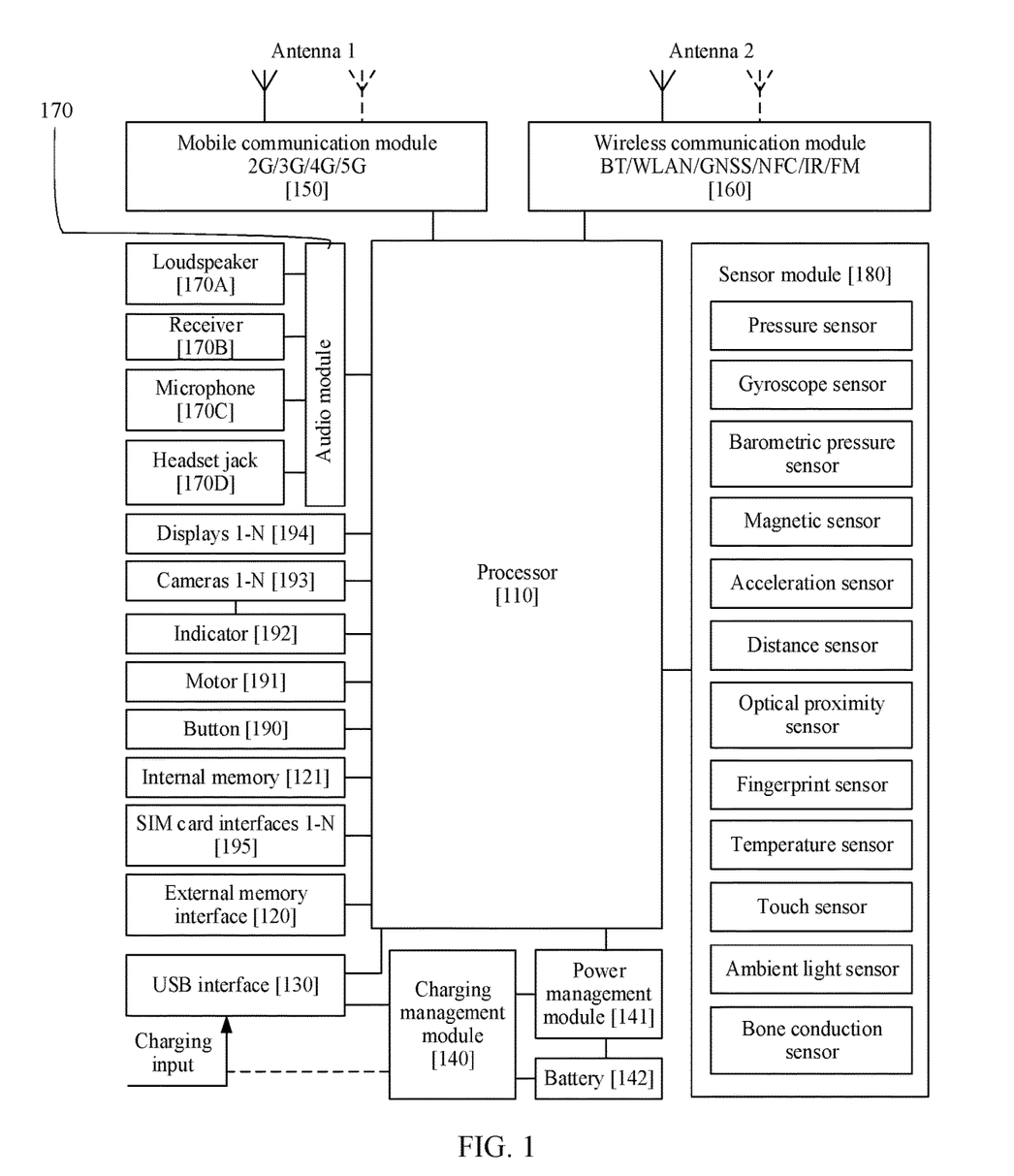
FIG. 1 is a schematic diagram of a hardware structure of an electronic device according to an embodiment of this application.

For example, FIG. 1 is a schematic diagram of a structure of an electronic device according to an embodiment of this application. Specifically, as shown in the figure, the electronic device includes a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

The processor 110 may include one or more processing units. For example, the processor 110 may include an application processor (application processor, AP), a modem (modem), a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or two or more different processing units may be integrated into one component.

The controller may be a nerve center and a command center of the electronic device. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. For example, the processor 110 includes a universal serial bus (universal serial bus. USB) port 130, and a subscriber identity module (subscriber identity module, SIM) interface 195. For another example, the processor 110 may further include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and/or the like.

It may be understood that, an interface connection relationship between the modules shown in this embodiment of this application is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The USB port 130 is a port that conforms to a USB standard specification, and may be specifically a mini USB port, a micro USB port, a USB Type C port, or the like. The USB port 130 may be configured to connect to a charger to charge the electronic device, may be configured to transmit data between the electronic device and a peripheral device, or may be configured to connect to a headset, to play audio through the headset. The interface may be further configured to connect to another electronic device such as an AR device.

The SIM card interface 195 is configured to connect to a SIM card. The SIM card may be inserted into the SIM card interface 195 or removed from the SIM card interface 195, to implement contact with or be separated from the electronic device. The electronic device may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 is also compatible with an external storage card. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments of wireless charging, the charging management module 140 may receive a wireless charging input through a wireless charging coil of the electronic device. The charging management module 140 may further supply power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communication module 150, the wireless communication module 160, the modem, the baseband processor, and the like.

The antenna 1 and the antenna 2 are configured to transmit and receive electromagnetic wave signals. Each antenna in the electronic device may be configured to cover one or more communication frequency bands. Different antennas may be reused to improve utilization of the antennas. For example, the antenna 1 may be reused as a diversity antenna of a wireless local area network. In some other embodiments, the antenna may be used in combination with a tuning switch.

The mobile communication module 150 may provide a solution that is applied to the electronic device and that is for wireless communication including formats such as 2G/3G/4G/5G. The mobile communication module 150 may include at least one filter, a switch, a power amplifier, a low noise amplifier (low noise amplifier, LNA), and the like.

The wireless communication module 160 may provide a solution that is applied to the electronic device and that is for wireless communication such as wireless local area networks (wireless local area networks, WLAN) (for example, a Wi-Fi network), Bluetooth (Bluetooth, BT), a global navigation satellite system (global navigation satellite system, GNSS), frequency modulation (frequency modulation, FM), near field communication (near field communication, NFC), or an infrared (infrared, IR) technology.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access. TD-SCDMA), long term evolution (long term evolution, LTE). BT, a GNSS, a WLAN, NFC, FM, an IR technology, and/or the like. The GNSS may include a global positioning system (global positioning system. GPS), a global navigation satellite system (global navigation satellite system. GLONASS), a BeiDou navigation satellite system (Beidou navigation satellite system, BDS), a quasi-zenith satellite system (quasi-zenith satellite system, QZSS), and/or a satellite based augmentation system(satellite based augmentation system, SBAS).

The electronic device implements a display function through the GPU, the display 194, the application processor, and the like. The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini-LED, a Miniled, a MicroLed, a Micro-oLed, quantum dot light-emitting diodes (quantum dot light-emitting diodes, QLED), or the like. In some embodiments, the electronic device may include one or N displays 194, where N is a positive integer greater than 1.

The electronic device can implement a photographing function through the ISP, the camera 193, the video codec, the GPU, the display 194, the application processor, and the like. The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and the image is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The external memory interface 120 may be configured to connect to an external storage card, for example, a Micro SD card, to extend a storage capability of the electronic device. The external memory card communicates with the processor 110 through the external memory interface 120, to implement a data storage function. For example, a file such as music or a video is stored in the external storage card.

The internal memory 121 includes a running memory (memory) and a built-in memory. The running memory may be configured to store computer-executable program code, data, or the like. The executable program code includes instructions. The processor 110 runs the instructions stored in the running memory, to perform various function applications of the electronic device and data processing. For example, the running memory may include a high speed random access memory. The built-in memory may also be referred to as a built-in external memory or the like, and may be configured to store a program and/or data. For example, the built-in memory may store an operating system, an integrated dynamic link library, a dynamic link library that is not integrated, and the like. Generally, after the electronic device loads program and/or data in the built-in memory to the running memory, the processor 110 runs the corresponding program and/or data to implement a corresponding function. For example, the electronic device may load the integrated dynamic link library in the built-in memory to the running memory, so that the processor 110 runs a corresponding application program. In addition, the internal memory 121 may include a nonvolatile memory, for example, at least one magnetic disk storage device, a flash memory, and a universal flash storage (universal flash storage, UFS).

The electronic device may implement an audio function, for example, music playing and recording, through the audio module 170, the speaker 170A, the receiver 170B, the microphone 170C, the headset jack 170D, the application processor, and the like.

The button 190 includes a power button, a volume button, and the like. The button 190 may be a mechanical button, or may be a touch button. The electronic device may receive a button input, and generate a button signal input related to user settings and function control of the electronic device.

The motor 191 may generate a vibration prompt. The motor 191 may be used for an incoming call vibration prompt, or may be used for a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light that may be configured to indicate a charging state and a battery power change, and may further be configured to indicate a message, a missed call, a notification, and the like.

It may be understood that the structure shown in this embodiment of this application does not constitute a specific limitation on the electronic device. In some other embodiments of this application, the electronic device may include more or fewer components than those shown in the figure, or some components may be combined, or some components may be split, or there may be a different component arrangement. The components shown in the figure may be implemented in hardware, software, or a combination of software and hardware.

In embodiments of this application, a software system of the electronic device may use a layered architecture, an event-driven architecture, a microkernel architecture, a microservice architecture, or a cloud architecture. In the layered architecture (for example, an Android (Android) system), software is divided into several layers, and each layer has a clear role and task. Layers communicate with each other through a software interface.

Figure 2:
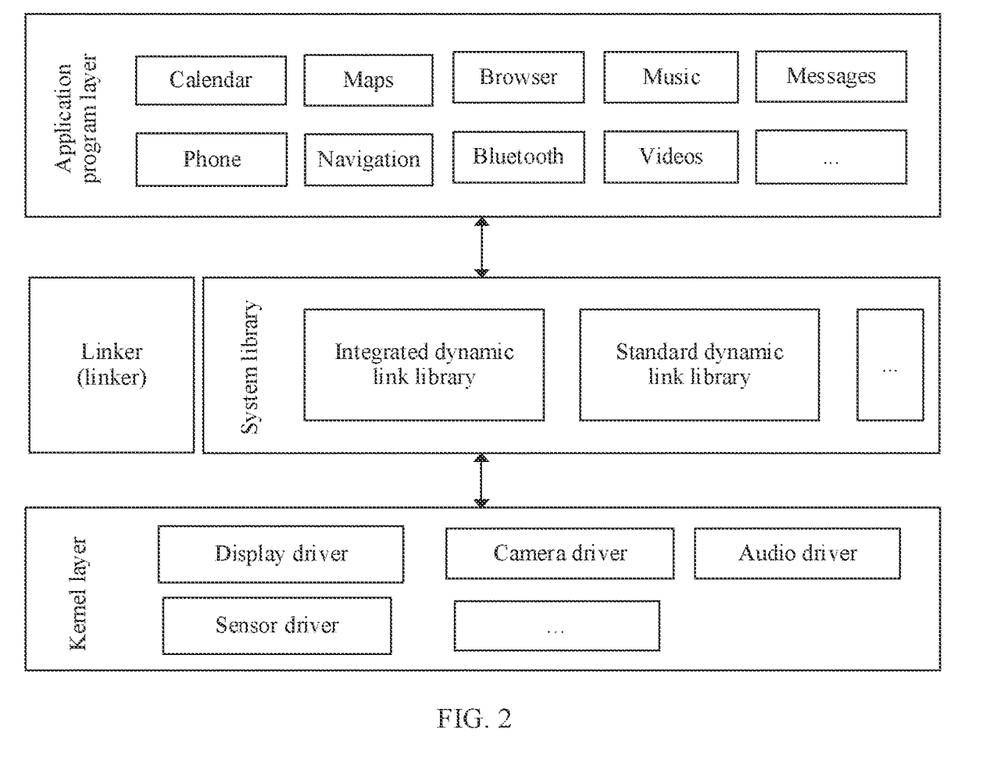
FIG. 2 is a schematic diagram of a software structure of an electronic device according to an embodiment of this application.

Specifically. FIG. 2 is a block diagram of a software structure of an electronic device according to an embodiment of this application. The electronic device includes an application program layer, a system library, a linker (linker), and a kernel layer. The application program layer may include application programs such as Camera, Gallery, Calendar, Phone, Maps, Navigation. Browser, Bluetooth, Music, Videos, and Messages.

The system library may provide a dynamic link library for the application program at the application program layer, for example, an integrated dynamic link library or a dynamic link library that is not integrated. In this embodiment of this application, the integrated dynamic link library may be obtained through a compiler by compiling source code of a plurality of dynamic link libraries for integration. Specifically, the integrated dynamic link library includes a virtual library list section and N binary sections. Each binary section includes content of a corresponding binary section in the plurality of dynamic link libraries for integration. In addition, the dynamic link library that is not integrated or the dynamic link library for integration in this embodiment of this application may be a basic dynamic link library or a standard dynamic link library. The Android system is used as an example, and libc, libc++, libpthread, libm, and the like are all standard dynamic link libraries or basic dynamic link libraries. The compiler may compile source code of some or all standard dynamic link libraries in the Android system to obtain one integrated dynamic link library.

The kernel layer is a layer between hardware and software. The kernel layer includes at least a display driver, a camera driver, an audio driver, and a sensor driver.

The linker is located between the system library and the kernel layer, and may be configured to load a dependency library of the application program, for example, the integrated dynamic link library or the dynamic link library that is not integrated. The dependency library of the application program may be understood as a dynamic link library that a mobile phone needs to use or depends on to run the application program.

A mobile phone having the structures shown in FIG. 1 and FIG. 2 is used as an example to describe embodiments of this application in detail with reference to the integrated dynamic link library.

First, the integrated dynamic link library is described in this embodiment of this application, to facilitate understanding of a person skilled in the art.

In this embodiment of this application, the integrated dynamic link library is used to implement normal running of an application program installed on the mobile phone, and may be obtained through the compiler by compiling the source code of the plurality of dynamic link libraries for integration. For example, the compiler compiles source code of M dynamic link libraries for integration to obtain one integrated dynamic link library. The compiler compiles source code of each dynamic link library for integration in the M dynamic link libraries for integration, to obtain a static link library and a dynamic link library. Further, a binary section included in the static link library obtained through the compiler by compiling the source code of the dynamic link library for integration is a binary section that needs to be used for running the application program. This helps save storage space. Then, the compiler performs integration according to the static link library obtained by compiling each dynamic link library for integration, to obtain an integrated dynamic link library. Specifically, the compiler obtains a virtual library list section according to an identifier of each dynamic link library for integration, integrates binary sections of a same type in the static link library obtained by compiling each dynamic link library for integration to obtain N binary sections, and generates the integrated dynamic link library based on the virtual library list section and the N binary sections. That is, the integrated dynamic link library includes the virtual library list section and the N binary sections. Each binary section includes content of a corresponding binary section in the M dynamic link libraries for integration. The virtual library list section includes identifiers of the M dynamic link libraries for integration. For example, the identifier of the dynamic link library for integration may be a virtual name (soname) of the dynamic link library for integration, or may be another identifier indicating the dynamic link library for integration. This is not limited in this embodiment of this application.

The Android system is used as an example. The compiler compiles source code of libc, libc++, and libpthrea, to obtain an integrated dynamic link library. The integrated dynamic link library includes a virtual library list section, a code section, a data section, and a BSS section. The virtual library list section includes an identifier of libc, an identifier of libc++, and an identifier of libpthrea. The code section of the integrated dynamic link library includes content in a code section of the libc, a code section of the libc++, and a code section of the libpthrea. The data section of the integrated dynamic link library includes content in a data section of the libc, a data section of the libc++, and a data section of the libpthrea. The BSS section of the integrated dynamic link library includes content in a BSS section of the libc, a BSS section of the libc++ and a BSS section of the libpthrea. It should be noted that the code section, the data section, and the BSS section each may be understood as a binary section.

In addition, in the Android system, generally, in addition to the code section, the data section, and the BSS section, the standard dynamic link base such as the libc, the libc++, or the libpthrea may further include a symbol table, a procedure linkage table (procedure linkage table, PLT), a global offset table, and the like. However, the symbol table, the PLT, the global offset table, and the like may not be used or invoked in the running process of the application program. Therefore, when compiling the source code of the plurality of dynamic link libraries for integration, the compiler no longer compiles, into the integrated dynamic link library, sections (sections) that are not used or not invoked in the running process of the application program. This helps save storage space.

In this embodiment of this application, because the binary section of the integrated dynamic link library includes content of the corresponding binary section in the plurality of dynamic link libraries for integration, in a case in which the section is aligned by page, compared with the plurality of dynamic link libraries for integration, the integrated dynamic link library helps further reduce a waste of running space memory. For example, the integrated dynamic link library includes the virtual library list section, the code section, the data section, and the BSS section. Except the virtual library list section, the code section, the data section, and the BSS section of the integrated dynamic link library are obtained by integrating content of the corresponding binary sections in the M dynamic link libraries for integration. For example, the integrated dynamic link library is obtained through the compiler by compiling source code of 200 dynamic link libraries for integration such as the libc, the libc++, the libpthread, and libm. In a case each section is aligned by page (4 KB), when the 200 dynamic link libraries for integration are not compiled into one integrated dynamic link library, each section in the 200 dynamic link libraries for integration is aligned by 4 KB. If each page wastes 2 KB memory on average, the 200 dynamic link libraries for integration waste about 200×3×4 KB/2=1200 KB memory. After one integrated dynamic link library is obtained by compiling the source code of the 200 dynamic link libraries for integration, the integrated dynamic link library includes the virtual library list section, the code section, the data section, and the BSS section. In the case in which each section is aligned by page (4 KB), if each page wastes 2 KB memory on average, the integrated dynamic link library wastes about 8 KB memory as the integrated dynamic link library includes four sections. Therefore, a waste of memory (for example, running memory and storage space of an internal memory) is greatly reduced than a case in which 200 dynamic ink libraries for integration are not compiled into one integrated dynamic link library.

Figure 3:
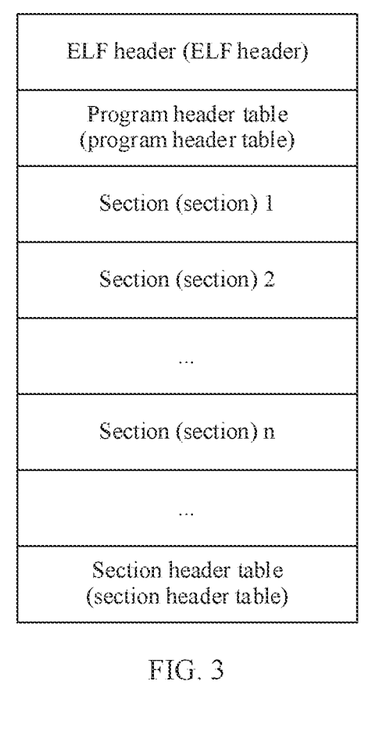
FIG. 3 is a schematic diagram of an ELF file according to an embodiment of this application.

Specifically, the integrated dynamic link library is configured in a built-in memory before the mobile phone is delivered from a factory. For example, the integrated dynamic link library may be stored in the built-in memory as an executable and linkable library format (executable and linkable format, ELF) file. A format of the ELF file is shown in FIG. 3, and includes an ELF header (ELF header), a program header table (program header table), a plurality of binary sections (sections) (for example, section 1, section 2, . . . , section n), and a section header table (section header table). The program header table includes a plurality of program headers (program headers), and each program header may include p_type, p_vaddr, p_offset, p_paddr, p_filesz, p_memsz, p_flags, and p_align. It should be noted that the program header table is optional (optional), that is, the ELF file may include the program header table, or may not include the program header table. The section header table includes a plurality of section headers. Each section header may include sh_name, sh_type, sh_flags, sh_addr, sh_offset, sh_size, sh_link, sh_link, sh_info, sh_addralign, and sh_entsize. Specifically, for related descriptions of the ELF header, the program header table, the section, and the section header table, refer to related descriptions of the ELF file in Wikipedia. Details are not described herein again. It should be noted that, for the ELF file of the integrated dynamic link library, the plurality of sections include a virtual library list section.

In addition, in this embodiment of this application, for a standard dynamic link library or a basic dynamic link library that is not integrated, these dynamic link libraries may be stored in the built-in memory as ELF files. For the format of the ELF files, refer to FIG. 3. However, the ELF files of these dynamic link libraries do not include a virtual library list section.

After the dynamic link library (for example, the integrated dynamic link library) is loaded from the built-in memory to a running memory, binary sections in the ELF file are stored in the running memory. Generally, the ELF header, program header, and section header table in the ELF file are not stored in the running memory. For example, the integrated dynamic link library includes a virtual library list section and N binary sections. After the integrated dynamic link library is loaded to the running memory, the running memory stores the virtual library list section and the N binary sections.

It should be understood that, in this embodiment of this application, the integrated dynamic link library may be a same-name dynamic link library, or may be not a same-name dynamic link library.

An Android operating system is used as an example. The integrated dynamic link library is the same-name dynamic link library, which may be understood as follows. A name of the integrated dynamic link library is the same as a name of a standard dynamic link library or a basic dynamic link library in the Android operating system. For example, the integrated dynamic link library includes M dynamic link libraries for integration. In a case in which the integrated dynamic link library is the same-name dynamic link library, the name of the integrated dynamic link library is a name of a first dynamic link library for integration, on which an application program depends, and that is in the M dynamic link libraries for integration. In this way, the mobile phone may first load the integrated dynamic link library for the application program.

It may be understood that, in the M dynamic link libraries for integration, the name of the first integrated dynamic link library for integration and on which different application programs depend, may be the same or may be different. For example, the M dynamic link libraries for integration are M standard dynamic link libraries in the Android operating system, and the M standard dynamic link libraries are respectively a standard dynamic link library 1 to a standard dynamic link library M. For example, a first dynamic link library on which an application program 1 depends is the standard dynamic link library 1 in the M standard dynamic link libraries, and the name of the integrated dynamic link library is a name of the standard dynamic link library 1. It should be noted that the first dynamic link library on which the application program 1 depends may be understood as a dynamic link library that is first used or invoked by the mobile phone when the mobile phone runs the application program 1. For another example, a first dynamic link library on which an application program 2 depends is the standard dynamic link library M in the M standard dynamic link libraries, and the name of the integrated dynamic link library is a name of the standard dynamic link library M. In addition, for another example, when a first dynamic link library on which an application program 3 depends is a standard dynamic link library N, but the standard dynamic link library N is not a dynamic link library in the M standard dynamic link libraries, and a dynamic link library that has a dependency relationship with the standard dynamic link library N is a standard dynamic link library 3, the name of the integrated dynamic link library may be a name of the standard dynamic link library 3. The dynamic link library that has the dependency relationship with the standard dynamic link library N is the standard dynamic link library 3, which may be understood as follows: The mobile phone first uses the standard dynamic link library N, and then uses the standard dynamic link library 3 when running the application program 3.

An Android operating system is used as an example. In this embodiment of this application, the integrated dynamic link library is not the same-name dynamic link library, which may be understood as follows: A name of the integrated dynamic link library is different from a name of a standard dynamic link library or a basic dynamic link library in the Android operating system, for example, libsystem. The integrated dynamic link library may be used first, and the mobile phone may pre-load the integrated dynamic link library. In this case, the integrated dynamic link library exists in the mobile phone.

In this embodiment of this application, regardless of the integrated dynamic link library or a dynamic link library that is not integrated, the mobile phone can be invoked by an invoker (for example, an application program) only after the mobile phone loads the integrated dynamic link library or the dynamic link library that is not integrated from the built-in memory to the running memory, to implement normal running of the application program. For example, in this embodiment of this application, the mobile phone may load a dependency library of the application program after starting the application program and before running the application program. For example, the mobile phone may load a dependency library of an application program in response to an operation of enabling the application program by a user, and then run the application program based on the dependency library of the application program. For example, the operation of enabling an application program may be an operation of tapping an application program icon, a voice instruction, a shortcut gesture operation, or the like. This is not limited herein. For another example, in a process of running the application program, before using the dynamic link library, the mobile phone may load a dependency library of the application program Specifically, in the process of running the application program by the mobile phone, a specific occasion for loading the dependency library of the application program may be predefined by R&D personnel in the program, or may be determined by the mobile phone based on a predefined algorithm with reference to a specific scenario. This is not limited in this embodiment of this application.

There may be one or more dependency libraries of the application program, and the dependency libraries are dynamic link libraries that need to be used or invoked to run the application program in the mobile phone, for example, the integrated dynamic link library or the dynamic link library that is not integrated.

After the integrated dynamic link library is introduced in this embodiment of this application, a dynamic link library loading method is provided, to enable a mobile phone to normally run an application program and enable an invoker (for example, the application program) to obtain a handle of a dynamic link library. For example, the mobile phone loads a dynamic link library A for an application program. When the invoker requests to load the dynamic link library A, the dynamic link library A is loaded. For example, when the application program requests a linker to load the dynamic link library A, the linker is enabled to perform the dynamic link library loading method in response to the request for loading the dynamic link library A. For example, when the application program is started, the application program requests the linker to load the dynamic link library A. Alternatively, when the application program runs, the application program requests the linker to load the dynamic link library A. For example, during specific implementation, the mobile phone may invoke a function (for example, the function may be defined by R&D personnel) when the application program is started or when the application program runs, so that the invoker (for example, the application program) requests the linker to load the dynamic link library A.

Figure 4:
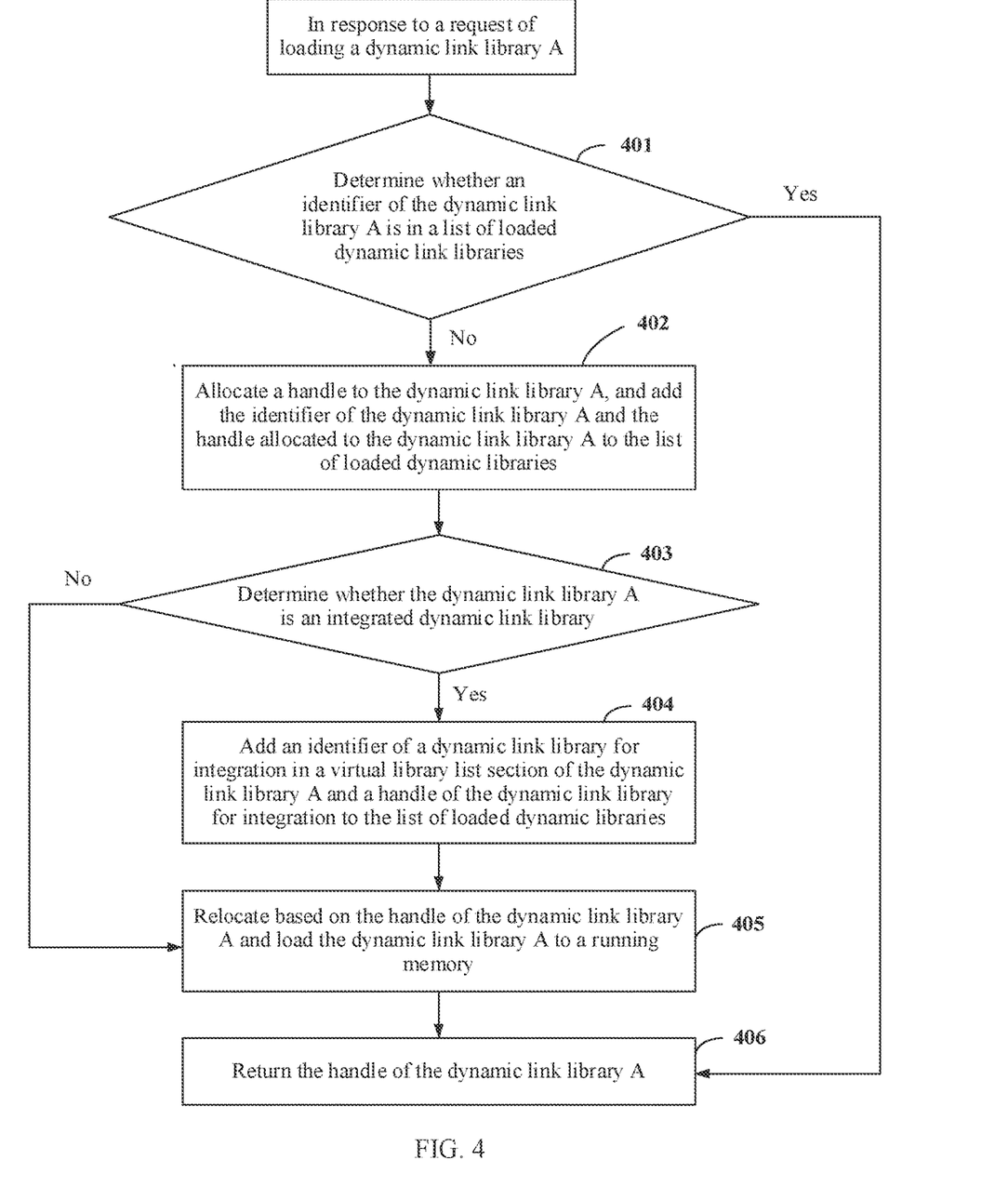
FIG. 4 is a schematic flowchart of a dynamic link library loading method according to an embodiment of this application.

For example, as shown in FIG. 4, the dynamic link library loading method in this embodiment of this application specifically includes the following steps.

Step 401: The mobile phone determines whether an identifier of the dynamic link library A is in a list of loaded dynamic link libraries, performs step 402 when the identifier of the dynamic link library A is not in the list, and performs step 406 when the identifier of the dynamic link library A is in the list. The list of loaded dynamic link libraries is used for avoiding repeated recording, and recording an identifier of a loaded dynamic link library and a handle corresponding to the identifier of the loaded dynamic link library. That is, the list of loaded dynamic-link libraries includes the identifier of the loaded dynamic link library and the handle corresponding to the identifier of the loaded dynamic link library.

Step 402: The mobile phone allocates a handle to the dynamic link library A, and adds the identifier of the dynamic link library A and the handle allocated to the dynamic link library A to the list of loaded dynamic link libraries.

Step 403: The mobile phone determines whether the dynamic link library A is an integrated dynamic link library, performs step 404 when the dynamic link library A is the integrated link library, and performs step 405 when the dynamic link library A is not the integrated link library.

For example, the mobile phone may determine whether the dynamic link library A is the integrated dynamic link library by determining whether the dynamic link library A includes a virtual link library list section. When the dynamic link library A includes the virtual library list section, the dynamic link library A is the integrated dynamic link library. When the dynamic link library A does not include the virtual library list section, the dynamic link library A is not the integrated dynamic link library. For another example, the mobile phone may further determine, by using a name of a dependency library, whether the dependency library is the integrated dynamic link library. This manner may be applied to a scenario in which the integrated dynamic link library is a different-same dynamic link library. In addition, the mobile phone may further determine, by using a field or an identifier section, whether the dynamic link library A is the integrated dynamic link library. A manner of determining the integrated dynamic link library by the mobile phone is not limited in this embodiment of this application.

Step 404: The mobile phone adds an identifier of a dynamic link library for integration in the virtual library list section of the dynamic link library A and a handle of the dynamic link library for integration to the list of loaded dynamic link libraries. The handle of the dynamic link library for integration is the handle allocated by the mobile phone to the dynamic link library A, that is, the handle of the dynamic link library A. Therefore, when the application program needs to invoke a dynamic library for integration in the dynamic link library A, the dynamic link library A may be relocated based on the handle of the dynamic link library A. This achieves an objective of normal running of the application program.

For example, the identifier of the dynamic link library for integration in the virtual list section of the dynamic link library A is an identifier of libc, an identifier of libc++, and an identifier of libpthrea. If the handle allocated by the mobile phone to the dynamic link library A is a handle A, handles of the libc, the libc++, and the libpthrea are also the handle A. If a first dependency library invoked by the application program is the libc, the application program may relocate to the dynamic link library A based on the handle A corresponding to the identifier of the libc, and run the application program based on the dynamic link library A.

Step 405: The mobile phone performs relocation based on the handle of the dynamic link library A, and loads the dynamic link library A to the running memory.

Step 406: The mobile phone returns the handle of the dynamic link library column A to the invoker.

For example, when a software architecture of the mobile phone is shown in FIG. 2, step 401 to step 406 may be performed by the linker in the mobile phone, to facilitate implementation.

It should be noted that there is no necessary sequence between step 402 and step 403, but step 402 and step 403 are performed before step 404. For example, the mobile phone may first perform step 403 to determine whether the dynamic link library A is the integrated dynamic link library, then perform step 402 to allocate the handle to the dynamic link library A, after the handle is allocated, perform step 404 when the dynamic link library A is the integrated dynamic link library, and perform step 405 when the dynamic link library A is not the integrated dynamic link library.

It should be noted that, in this embodiment of this application, when the application program has a plurality of dependency libraries, for a procedure of loading each dependency library by the mobile phone, refer to the dynamic link library loading method shown in FIG. 4. For example, for an application program, the mobile phone loads a dynamic link library based on a dependency sequence between dependency libraries of the application program. For example, dependency libraries of an application program A are a dynamic link library 1, a dynamic link library 2, and a dynamic link library 3. The dynamic link library 1 is a first dynamic link library on which the application program A depends, the dynamic link library 1 depends on the dynamic link library 2, and the dynamic link library 2 depends on the dynamic link library 3. In this case, the mobile phone first loads the dynamic link library 1, then loads the dynamic link library 2, and finally loads the dynamic link library 3 for the application program A.

In addition, when the application program has the plurality of dependency libraries, the invoker (for example, the application program) may cyclically request the linker to load a dynamic link library, and the dynamic link library that the invoker requests the linker to load is the dependency library of the application program. For example, the invoker may request, based on the dependency sequence between dependency libraries of the application program, the linker to load a dynamic link library, so that the linker can cyclically load the dynamic link library in response to a request for cyclically loading a dynamic link library.

Further, after the mobile phone completes loading a dynamic link library for an application program, that is, after a dependency library of the application program is loaded, the mobile phone may run the application program based on the loaded dynamic link library. For example, when the dependency library of the application program is the dynamic link library for integration, the mobile phone runs the application program based on the integrated dynamic link library.

In a case in which the application program has a plurality of dependency libraries, and the plurality of dynamic link libraries are all dynamic link libraries for integration, because the plurality of dynamic link libraries are all integrated into one integrated dynamic link library, the application program may invoke a corresponding function or parameter from the integrated dynamic link library by relocating the integrated dynamic link library only once. Because an address offset between another function or parameter that has a dependency relationship with the function or parameter in the integrated dynamic link library and the function or parameter invoked by relocation is specific, the application program may directly read the another function or parameter from the integrated dynamic link library without relocation. This helps save time overheads.

Figure 5:
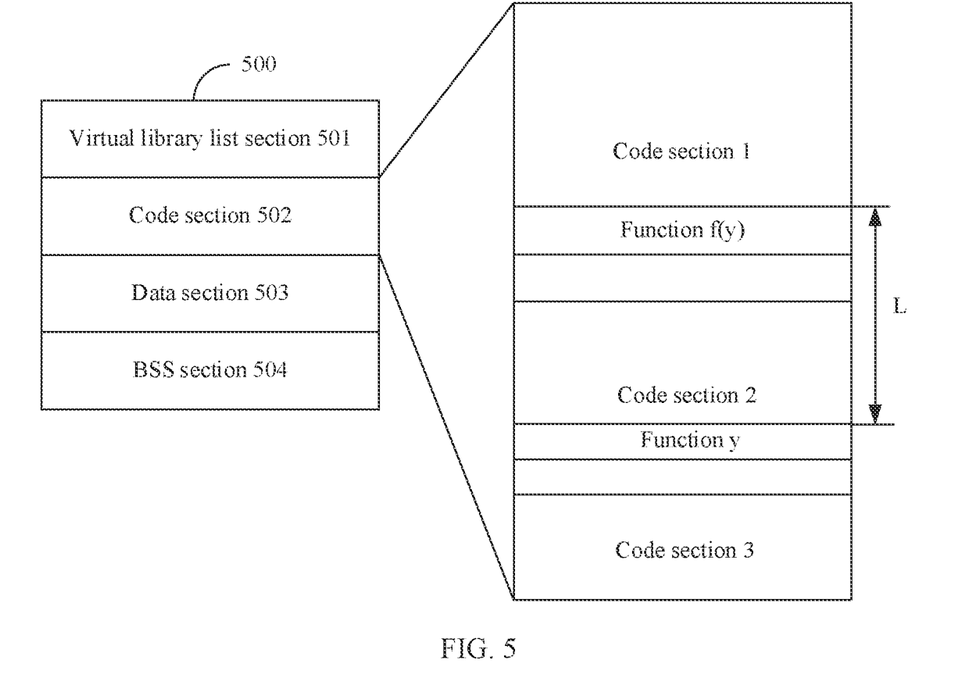
FIG. 5 is a schematic diagram of an integrated dynamic link library according to an embodiment of this application.

For example, as shown in FIG. 5, an integrated dynamic link library 500 includes a virtual library list section 501, a code section 502, a data section 503, and a BSS section 504. The virtual library list section 501 includes an identifier of libc and an identifier of libc++. The libc includes a code section 1, and the libc++includes a code section 2. The code section 502 includes a code section 1 and a code section 2. The code section 1 includes a function f(y), and the code section 2 includes a function y. The application program may invoke the function f(y) based on a handle of the integrated dynamic link library 500 and a symbol of the integrated dynamic link library 500. However, execution of the function f(y) depends on the function y. In the integrated dynamic link library 500, a relative address offset between the function y and the function f(y) is L, which is specific. Therefore, the application program may not need to perform relocation when invoking the function y.

The foregoing embodiments may be used separately, or may be used in combination to implement different technical effects.

In the foregoing embodiments provided in this application, the method provided in embodiments of this application is described from a perspective of a mobile phone serving as an execution body. To implement the functions in the method provided in embodiments of this application, the mobile phone may include a hardware structure and/or a software module, and the foregoing functions are implemented in a form of the software module or a combination of the hardware structure and the software module. Whether a function in the foregoing functions is performed by using the hardware structure, the software module, or the combination of the hardware structure and the software module depends on particular applications and design constraints of the technical solutions.

Figure 6:
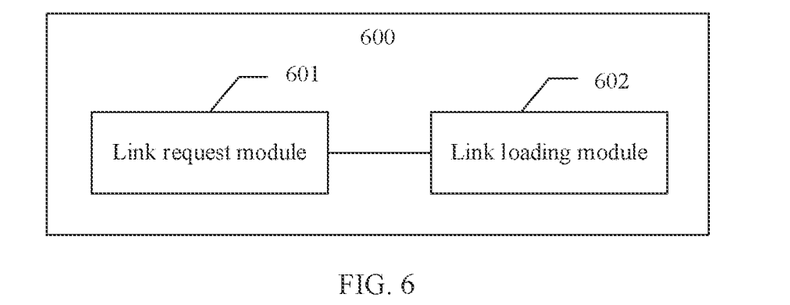
FIG. 6 is a schematic diagram of a structure of an apparatus according to an embodiment of this application.

FIG. 6 is a schematic diagram of a structure of an apparatus according to an embodiment of this application. The apparatus 600 specifically includes a link request module 601 and a link loading module 602. For example, the apparatus 600 includes the link request module 601 and the link loading module 602. The link request module 601 is configured to receive a request for loading a first dynamic link library.

The link loading module 602 is configured to perform:

in response to the request for loading the first dynamic link library, determine whether an identifier of the first dynamic link library is in a list of loaded dynamic link libraries;

when the identifier of the first dynamic link library is not in the list of loaded dynamic link libraries, allocate a handle to the first dynamic link library, and add the identifier of the first dynamic link library and the handle allocated to the first dynamic link library to the list of loaded dynamic link libraries;

determine whether the first dynamic link library is an integrated dynamic link library;

when the first dynamic link library is the integrated dynamic link library, add identifiers of M dynamic link libraries for integration and the handle allocated to the first dynamic link library to the list of loaded dynamic link libraries, where the first dynamic link library is obtained through a compiler by compiling source code of the M dynamic link libraries for integration; and relocate the first dynamic link library based on the handle allocated to the first dynamic link library, and load the first dynamic link library into a running memory of an electronic device.

Figure 7:
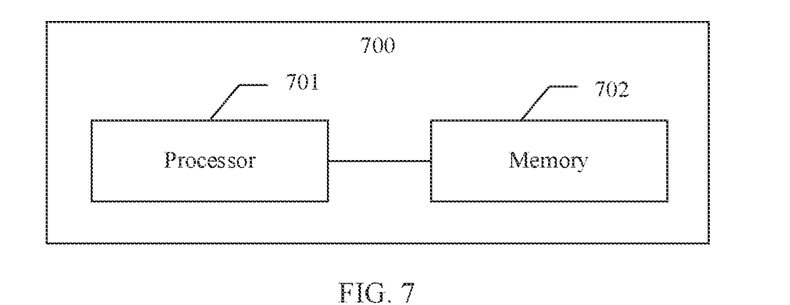
FIG. 7 is a schematic diagram of a structure of another electronic device according to an embodiment of this application.

As shown in FIG. 7, an embodiment of this application discloses an electronic device 700. The electronic device 700 may include one or more processors 701, a memory 702, and one or more computer executable programs. The foregoing components may be connected through one or more communication buses. The one or more computer executable programs are stored in the memory 702, and are configured to be executed by the one or more processors 701, to implement the dynamic link library loading method shown in FIG. 4 in embodiments of this application.

The processor in the foregoing embodiments may be a general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware processor, or may be performed and completed by using a combination of hardware and software modules in the processor. The software module may be located in a mature storage medium in the art, such as a random access memory (random access memory, RAM), a flash memory, a read-only memory (read-only memory. ROM), a programmable read-only memory, an electrically erasable programmable memory, or a register. The storage medium is located in the memory, and the processor reads information in the memory and completes the steps in the foregoing methods in combination with the hardware of the processor.

Specifically, for a specific implementation of the apparatus 600 and the electronic device 700, refer to related descriptions in the method part. Details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application.

It may be clearly understood by a person skilled in the art that, for ease of convenience and brevity, for a detailed working process of the foregoing system, apparatus, and unit, refer to a corresponding process in the foregoing method embodiments. Details are not repeatedly described herein.

In the several embodiments provided in this application, it should be understood that the disclosed system, apparatus and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) or a processor (processor) to perform all or some of the steps of the methods described in embodiments of this application. The foregoing storage medium includes various media that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A dynamic link library loading method implemented by an electronic device, wherein the dynamic link library loading method comprises:
   obtaining a first request of an application program for loading a first dynamic link library;
   determining, in response to obtaining the first request, whether an identifier of the first dynamic link library is in a list of loaded dynamic link libraries; and
   performing step A, step B, and step C when the identifier is not in the list,
   wherein step A comprise allocating a handle to the first dynamic link library and adding the identifier and the handle to the list,
   wherein step B comprises determining whether the first dynamic link library is an integrated dynamic link library and performing step 1 and step 2 in sequence when the first dynamic link library is the integrated dynamic link library,
      wherein step 1 comprises adding identifiers of M dynamic link libraries for integration and the handle to the list, wherein the first dynamic link library is based on source code of the M dynamic link libraries, and wherein M is a positive integer greater than one; and wherein step 2 comprises relocating the first dynamic link library based on the handle and loading the first dynamic link library into a running memory of the electronic device; and wherein step C comprises returning the handle to the application program.

2. The dynamic link library loading method of claim 1, wherein the first dynamic link library comprises:

a virtual library list section comprising the identifiers; and

N binary sections, wherein any one of the N binary sections comprises content of a corresponding binary section in the M dynamic link libraries, and wherein N is a positive integer greater than or equal to one.

3. The dynamic link library loading method of claim 1, further comprising:

when the application program is started;
obtaining a second request of the application program; and
cyclically loading, in response to obtaining the second request, wherein the first dynamic link library is one of a plurality of dependency libraries of the application program; and running the application program when loading the first dynamic link library.

4. The dynamic link library loading method claim 1, further comprising:

compiling a corresponding source code in the source code to obtain each of M static link libraries; and
integrating the M static link libraries to obtain the first dynamic link library.

5. The dynamic link library loading method of claim 1, wherein the identifier is in the list, and wherein prior to performing step C, the dynamic link library loading method further comprises obtaining the handle based on the identifier.

6. The dynamic link library loading method claim 1, wherein after determining whether the first dynamic link library is the integrated dynamic link library, before performing step C, and when the first dynamic link library is not the integrated dynamic link library, the dynamic link library loading method further comprises:

performing step 3 prior to performing step C when the first dynamic link library is not the integrated dynamic link library, and wherein step 3 comprises:
relocating the first dynamic link library based on the handle; and
loading the first dynamic link library into the running memory.

7. The dynamic link library loading method of claim 2, further comprising:

determining whether the first dynamic link library comprises the virtual list section; and
determining that the first dynamic link library is the integrated dynamic link library when the first dynamic link library comprises the virtual list section.

8. The dynamic link library loading method of claim 2, further comprising:

determining whether the identifier is a predefined identifier; and
determining that the first dynamic link library is the integrated dynamic link library when the identifier is the predefined identifier.

9. An electronic device comprising:
a memory configured to store instructions; and
a processor coupled to the memory and configured to execute the instructions to cause the electronic device to:
receive a first request of an application program for loading a first dynamic link library;
determine, in response to receiving the first request, whether an identifier of the first dynamic link library is in a list of loaded dynamic link libraries; and
perform step A, step B, and step C when the identifier is not in the list C,
wherein step A comprises allocating a handle to the first dynamic link library and add the identifier and the handle to the list,
wherein step B comprises determining whether the first dynamic link library is an integrated dynamic link library and performing step 1 and step 2 in sequence when the first dynamic link library is the integrated dynamic link library,
wherein step 1 comprises adding identifiers of M dynamic link libraries for integration and the handle to the list, wherein the first dynamic link library is based on source code of the M dynamic link libraries; and wherein M is a positive integer greater than one, and
wherein step 2 comprises relocating the first dynamic link library based on the handle, and loading the first dynamic link library into a running memory of the electronic device; and
wherein step C comprises returning the handle to the application program.

10. The electronic device of claim 9, wherein the first dynamic link library comprises:

a virtual library list section comprising the identifiers; and
N binary sections, wherein any one of the N binary sections comprises content of a corresponding binary section in the M dynamic link libraries, and wherein N is a positive integer greater than or equal to one.

11. The electronic device of claim 9, wherein the processor is further configured to execute the instructions to cause the electronic device to:

when the application program is started;
obtain a second request of the application program; and
cyclically load, in response to obtaining the second request a dependency library, wherein the first dynamic link library is one of a plurality of dependency libraries of the application program; and
run the application program when loading the first dynamic link library.

12. The electronic device of claim 9, wherein the processor is further configured to execute the instructions to cause the electronic device to:

compile a corresponding source code in the source code to obtain each of M static link libraries; and
integrate M static link libraries to obtain the first dynamic link library.

13. The electronic device of claim 9, wherein the identifier is in the list, and wherein the processor is further configured to execute the instructions to cause the electronic device to, prior to performing step C, obtain the handle based on the identifier.

14. The electronic device of claim 9, wherein after determining whether the first dynamic link library is the integrated dynamic link library, the processor is further configured to execute the instructions to cause electronic device to perform step 3 prior to performing step C when the first dynamic link library is not the integrated dynamic link library, and wherein step 3 comprises relocating the first dynamic link library based on the handle and loading the first dynamic link library into the running memory.

15. The electronic device of claim 9, wherein the processor is further configured to execute the instructions to cause the electronic device to:
- determine whether the first dynamic link library comprises a virtual list section; and
- determine that the first dynamic link library is the integrated dynamic link library when the first dynamic link library comprises the virtual list section, wherein the first dynamic link library is the integrated dynamic link library.

16. The electronic device of claim 9, wherein the processor is further configured to execute the instructions to cause the electronic device to:
- determine whether the identifier is a predefined identifier; and
- determine that the first dynamic link library is the integrated dynamic link library when the identifier is the predefined identifier.

17. A computer program product comprising computer-executable instructions stored on a non-transitory computer readable storage medium that, when executed by a processor, cause an electronic device to:
- receive a first request of an application program for loading a first dynamic link library;
- determine, in response to receiving the first request, whether an identifier of the first dynamic link library is in a list of loaded dynamic link libraries; and
- perform step A, step B, and step C when the identifier is not in the list,
  - wherein step A comprises allocating a handle to the first dynamic link library and adding the identifier and the handle to the list,
  - wherein step B comprises determining whether the first dynamic link library is an integrated dynamic link library and performing step 1 and step 2 in sequence when the first dynamic link library is the integrated dynamic link library,
  - wherein step 1 comprises adding identifiers of M dynamic link libraries for integration and the handle to the list, wherein the first dynamic link library is based on source code of the M dynamic link libraries, and wherein M is a positive integer greater than one, and
  - wherein step 2 comprises relocating the first dynamic link library based on the handle and loading the first dynamic link library into a running memory of the electronic device; and
- wherein step C comprises returning the handle to the application program.

18. The computer program product of claim 17, wherein the first dynamic link library comprises:
- a virtual library list section comprising the identifiers; and
- N binary sections, wherein any one of the N binary sections comprises content of a corresponding binary section in the M dynamic link libraries, and wherein N is a positive integer greater than or equal to one.

19. The computer program product of claim 17, wherein the computer-executable instructions further cause the electronic device to:
- when the application program is started:
  - obtain a second request of the application program; and
  - cyclically load, in response to obtaining the second request, a dependency library, wherein the first dynamic link library is one of a plurality of dependency libraries of the application program; and
  - run the application program when loading the first dynamic link library.

20. The computer program product of claim 17, wherein the computer-executable instructions further cause the electronic device to:
- compile a corresponding source code in the source code to obtain each of M static link libraries; and
- integrate M static link libraries to obtain the first dynamic link library.

\* \* \* \* \*

UNITED STATES PATENT AND TRADEMARK OFFICE
CERTIFICATE OF CORRECTION

PATENT NO. : 11,886,222 B1
APPLICATION NO. : 17/796454
DATED : January 30, 2024
INVENTOR(S) : Tao Wang and Wenyong Sun It is certified that error appears in the above-identified patent and that said Letters Patent is hereby corrected as shown below:

In the Claims

Claim 3, Column 21, Line 24: "request, wherein" should read "request, a dependency library, wherein"

Claim 9, Column 22, Line 12: "list C," should read "list,"

Claim 9, Column 22, Line 24: "libraries; and" should read "libraries, and"

Claim 9, Column 22, Line 27: "handle, and" should read "handle and"

Signed and Sealed this
Second Day of April, 2024

Katherine Kelly Vidal
*Director of the United States Patent and Trademark Office*